United States Patent
Gram

(10) Patent No.: US 7,320,591 B2
(45) Date of Patent: Jan. 22, 2008

(54) PROCEDURE AND MACHINE FOR MULTI-COMPONENT MOLDING

(76) Inventor: Jes Tougaard Gram, c/o Gram Gruppen APS Blokken 27, D-3460 Birkerod (DK)

( * ) Notice: Subject to any disclaimer, the term of this patent is extended or adjusted under 35 U.S.C. 154(b) by 508 days.

(21) Appl. No.: 10/631,876

(22) Filed: Jul. 31, 2003

(65) Prior Publication Data

US 2004/0119200 A1 Jun. 24, 2004

Related U.S. Application Data

(63) Continuation of application No. 09/380,006, filed as application No. PCT/DK98/00072 on Feb. 24, 1998, now abandoned.

(30) Foreign Application Priority Data

Feb. 25, 1997 (DK) .................................. 0208/97

(51) Int. Cl.
 *B29C 59/02* (2006.01)
 *B29C 70/84* (2006.01)
(52) U.S. Cl. .................... 425/576; 425/112; 425/127; 425/134; 425/574; 264/255; 264/297.6
(58) Field of Classification Search ............. 425/134, 425/112, 576, 553, 574, 540; 264/255, 297.6, 264/310
See application file for complete search history.

(56) References Cited

U.S. PATENT DOCUMENTS

| 3,832,110 A | 8/1974 | Hehl |
| 4,330,257 A | 5/1982 | Rees |
| 4,589,840 A | 5/1986 | Schad |

FOREIGN PATENT DOCUMENTS

| DE | 4328853 | 1/1995 |
| JP | 60105512 | 6/1985 |
| JP | 1110918 | 4/1989 |
| JP | 2143819 | 6/1990 |
| JP | 8108449 | 4/1996 |
| WO | WO 91/02640 | 3/1991 |

OTHER PUBLICATIONS

English Abstracts for DE 43 28 853.*

* cited by examiner

*Primary Examiner*—Yogendra N. Gupta
*Assistant Examiner*—Dimple Bodawala
(74) *Attorney, Agent, or Firm*—Edward J. Chalfie; Ladas & Parry LLP

(57) ABSTRACT

A process for the molding of an assembled object in at least two subsequent moldings and a machine for the performance of the process are provided. The object is molded in a mold comprising at least three mold parts. When the mold is open, at least one of the mold parts or a part thereof is rotatable about an axis which is parallel to the mutual direction of movement of the mold part in relation to the opposing mold part. In a mold consisting of three mold parts, the middle part may be rotatable in relation to the two outermost mold parts.

13 Claims, 2 Drawing Sheets

PROCEDURE AND MACHINE FOR MULTI-COMPONENT MOLDING

Figure 1:
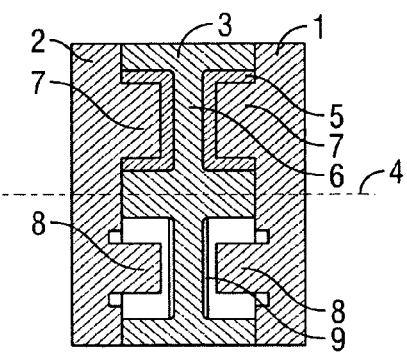

This application is a CON of Ser. No. 09/380,006 Nov. 29, 1999 ABN which is a 371 of PCT/DK98/00072 Feb. 24, 1998.

The invention concerns a procedure for the production of an in at least two subsequent moldings molded object in a mold consisting of at least three mold parts and a machine for the performance of this procedure.

It is a known technique to mold an assembled object in two or more subsequent moldings, e.g., an injection molded object in plastic in two different colors molded subsequently in the same mold. This can be realized by the material of one color is molded at first in one part of a, for this purpose, arranged mold, e.g., a letter in a key for an injection molded keyboard. After the cooling of the material and removing of the core parts, the material of the second color is then molded around the molded letter, which now serves as a part of the mold for the finished key. This procedure requires an injection molding machine with two injection units.

Such a two component molding can preferably be realized in a so-called index mold. This is a mold where one of the two mold parts, either the stationary front part with the injection unit or the movable back part with the ejection unit, is equipped with a build-in turning table. The turning table can preferably turn 180 degrees around an axis passing through the center of the turning table and parallel to the mutual direction of movement of the two mold parts.

Hereby is achieved that the first part of the for the co-molding intended object, e.g., can be molded in those of the closed mold fanned mold cavities which are placed in the upper half of the mold. After the opening of the mold, turning of the turning table 180 degrees and reclosing of the mold, the last part of the object subsequently can be molded in the mold cavities, which qua the first molding is toned in the lower half of the mold.

There are also known molds that beyond the two common mold parts, the stationary front part and the movable back part, comprises a third mold part. This is the case in the so-called three plate tools. Here the inlet channels in the mold, e.g., are placed between the two foremost mold parts and the objects between the two hindmost mold parts. Hereby is achieved that the objects and the inlets are torn off and ejected separately when the mold is opened after each molding cycle. The advantage of such a mold is that the inlets and the finished objects hereby can be kept separated more easily and you can save the expensive hot-runner systems.

There are also known another kind of molds consisting of more than two mold parts, the so-called sandwich molds/stack molds. In its most simple design a sandwich mold consists of three mold parts as there beside the front part and the back part is a middle part. In reality you hereby obtain two side by side placed independent molds which open and close simultaneously by means of an on the outside of the mold placed frame system. This frame system connects, e.g., via a knee hinged joint system the middle part, whereto the frame system is firmly attached, with the two outermost mold parts.

The advantage of such a sandwich mold is that there in principle are molded twice as many objects per time unit compared to a common mold consisting of two mold parts.

There are also known sandwich molds with a larger number of mold parts, e.g., five, hereby is in reality achieved four independent molds which open and close simultaneously by means of the on the outside of the mold placed frame system which also here is attached to the middle mold part.

The purpose of the procedure and the machine according to the invention is to unite the advantage of the highly increased number of objects per time unit from the sandwich mold with the suitability of the index mold especially for the molding of objects molded in at least two subsequent moldings in the same mold. An extra advantage is that you can achieve the balance in the mold by popular speaking to mold "upwards" in the one part at the same time as you mold "downwards" in the other part. This results that the mold is stressed uniformly during the molding process in contrast to a common index mold where the pressure primarily is not centered. A further explanation on this is given beneath under FIG. 4.

The procedure according to the invention is characterized by the fact, that in each of the at least two in the closed mold formed pair of cavities is, when the mold is open, at least one of the two mold parts or parts hereof turnable in relation to the opposite mold part, e.g., 180 degrees around an axis which is parallel to the mutual direction of movement of the mold parts.

The principle in the procedure according to the invention can in its simplest form be described in the case with three mold parts, where the middle part alone contains a turnable element. For each molding cycle is presumed that in each of the two hereby achieved molds is molded a single object comprising two parts, e.g., a screw cap of plastic and the matching threaded tube neck, intended for the placement on a pill jar. The screw cap preferably is molded at first, e.g., in the upper half of the mold. After cooling and opening of the mold the middle part is turned half a round, hereafter the mold is reclosed. With the inside of the screw cap serving as a part of the mold the corresponding threaded tube neck is molded. Simultaneous with the final molding of the first set of the assembled objects in the now downwards placed part of the mold, is in the upper half of the mold molded the next set of screw caps, and so the process is continued.

The cycle described above is for two similar objects molded assembled and ejected together per cycle. In principle the case is the same for a larger number of mold cavities in the mold, as well as if the mold consists of more than three cooperating mold parts.

The procedure according to the invention can hereby achieve a considerable saving in both time and costs by the molding of objects consisting of two or more components compared to the hitherto known methods for subsequent molding.

By the design of the mold tool you will have to consider that the first molded parts of the objects after cooling and opening of the mold remains in/on the turnable mold part(s). Hereby at the turning they will, e.g., be moved from the upper half of the mold to the lower half. The simplest way to obtain this is by a better hold-down in the turnable mold part(s) than in the not turnable.

In a special suitable design of the machine for the performing of the procedure according to the invention there is a preferably through the common axis of all the turnable parts running axle. This axle can turn the turnable parts which preferably are situated in every second of the mold parts while the axle can pass through the other mold parts, the so-called stationary mold parts, without activating those.

Figure 2:
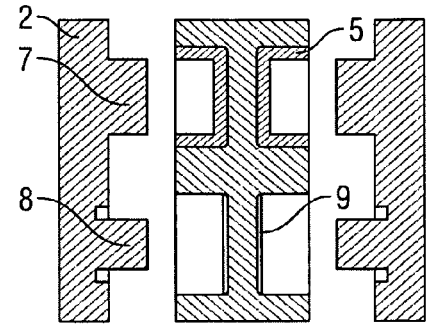
Figure 3:
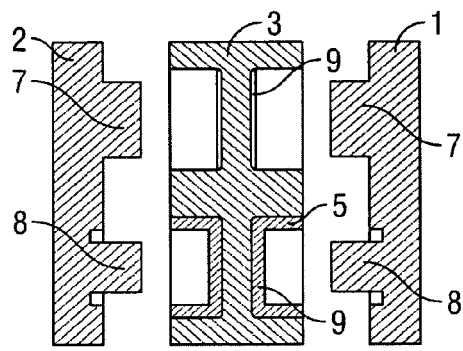
Figure 4:
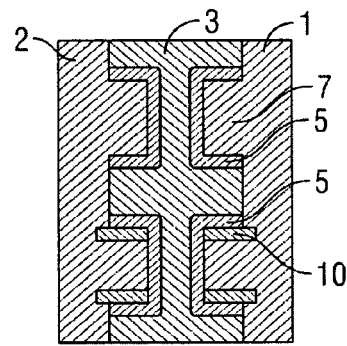
Figure 5:
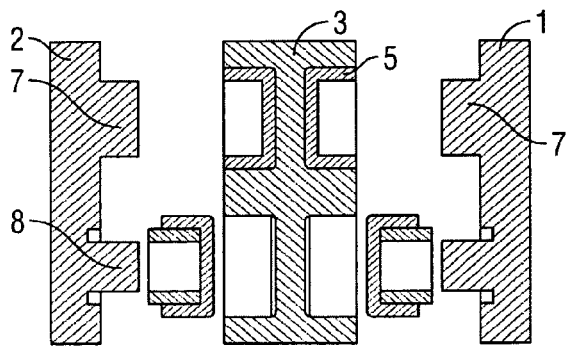
Figure 6:
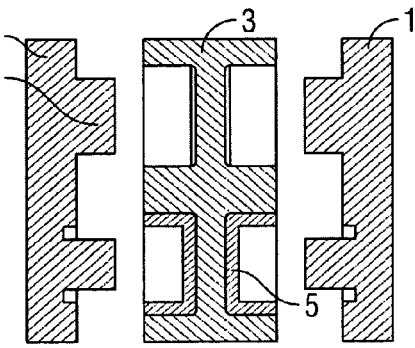
Figure 7:
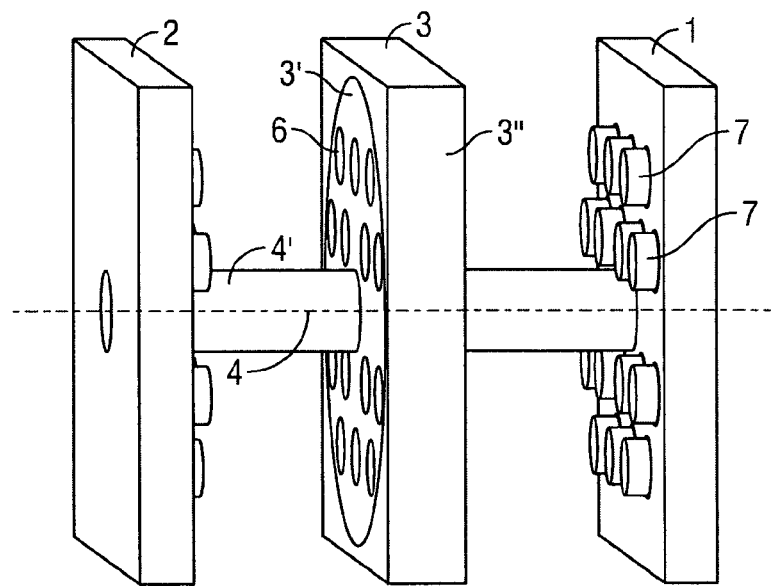
Figure 8:
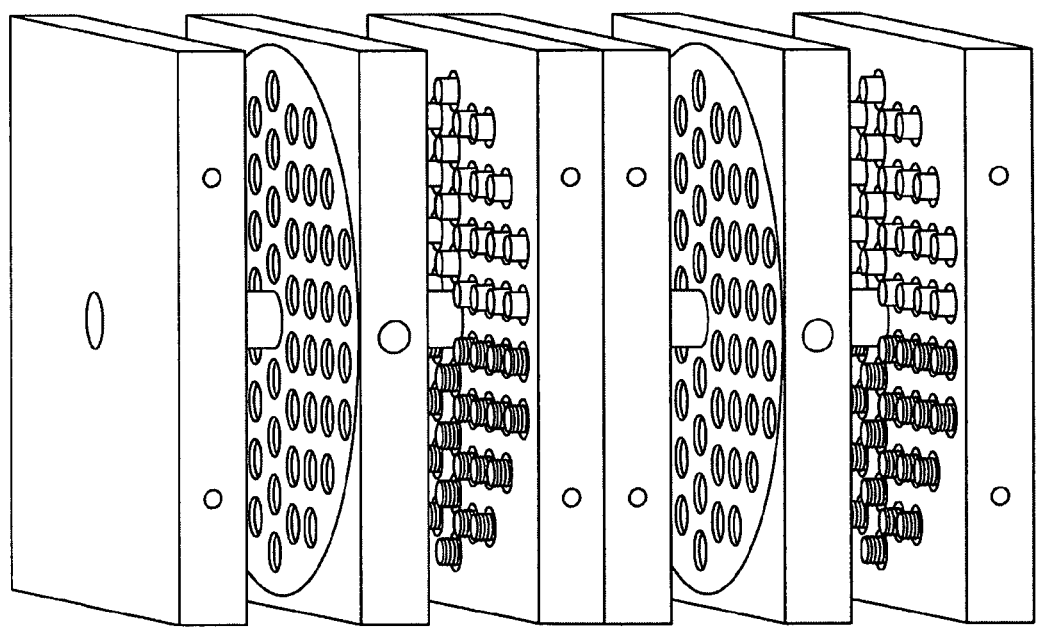

The more specific advantages by the different designs of the invention will be disclosed in the description to the drawing and by the actual drawing, where FIG. 1 shows a design according to the invention in a closed position, FIG. 2 the same in an open position, FIG. 3 the same in an open position with the middle part turned, FIG. 4 the same in a closed position, FIG. 5 the same in an open position by the ejection of the finished objects, FIG. 6 the same after a new turning in an open position, FIG. 7 another design in an open position, FIG. 8 a third design in an open position.

In FIG. 1 is shown in closed condition from the side a cross section of an example of a mold for the performance of the procedure according to the invention. The mold consists of a stationary front part 1, a movable back part 2, as well as a hereby simultaneous movable middle part 3, that also is intended to be turned around a here horizontal axis 4. In the example there has just been molded as the first part S of the assembled object a screw cap in the two above the axis 4 formed mold cavities 6. On respectively the front part 1 and the back part 2 is shown the large cores 7 at the top for the first molding and the somewhat smaller cores 8 for the following molding. In the middle part 3 is shown the symmetrical placed and identical cavities 9 that together with the large cores 7 form the mold cavities 6.

FIG. 2 shows a cross section of the same mold in an open position, where the two first parts of the assembled objects 5 are molded and positioned in the cavities 9 in the middle part 3.

In FIG. 3 is shown the same mold still fully opened, but where the middle part 3 is turned 180 degrees around the horizontal axis 4, so that the two first molded parts 5 now are positioned precisely facing the smallest cores 8 in the two not turnable mold parts 1 and 2.

In FIG. 4 is shown the same mold after reclosing. There are on the mold parts some not shown guide pins and corresponding holes which by the closing steer the mold parts precisely together after the turning. It will be noticed that the mold during the whole process is symmetrical around a plane at right angles to the plane of the paper and right down through the center line of the middle part 3. This causes that the closing pressure are distributed relative uniformly on the two sets of mold cavities, respective the right and the left set. To obtain an even better distribution of the molding process over the total surface area the mold cavities and the corresponding cores can be placed so they are symmetrical placed in relation to the center of the middle part. Hereby is molded the first part 5 at the same time, e.g., above in the right mold and beneath in the left mold, and the following part 10 at the same time corresponding beneath in the right mold and above in the left mold. Hereby obtaining the most complete balance throughout the whole molding process which strain the mold least possible. The last mentioned possibility is not shown on the drawing. In FIG. 4 is further shown that there inside the first molded part 5, the screw cap, which now serves as a part of the mold, now is molded the last part 10, the threaded tube neck, of the assembled object. The outer threading of this has after the cooling shrunk a bit, so it fits well into the inner threading of the screw cap, of which it is a print.

FIG. 5 shows the same mold in an open position during the ejection of the two final molded objects.

In FIG. 6 is the same mold is shown where the middle part 3 again is turned 180 degrees around the axis 4. It will be noticed that FIG. 6 corresponds to FIG. 3, and like this the process can continue. Alternatively to the various turnings have been at 180 degrees there could also have been shown turnings on 120 degrees, 90 degrees or another specified graduation, which makes respectively a three component, a four component molding etc. possible. The increased number of graduations cart, e.g., also be used for extra cooling stations, if for example some of the moldings need a longer cooling time than others as well as molding in a closed mold etc.

FIG. 7 shows in perspective another design of a mold with three parts. Here the middle part 3 is parted in a turnable part 3' and a not-turnable part 3", where the turnable part 3' is positioned by means of a not on the drawing shown ball bearing or the like, which eases the turning because the pate/plates are not stressed on their respective closing area during the turning. The turning axis 4, which here is a real turning axle 4', is designed in such a way that it can pass through the two not-turnable mold parts 1 and 2 while it activates the turnable part 3' of the middle part 3.

In FIG. 8 in perspective a third design is shown of a mold according to the invention with five mold parts resulting in four separate molds, here shown in an open position. In the example shown there are 30 plus 30 cavities in each of these molds, so that per completed cycle a total of 120 assembled objects are ejected.

The in the drawing shown designs of the machine according to the invention are only a limited part of the possible examples of designs. Yet they should be sufficient for showing the fundamental principles of the invention.

Beside the on the drawing shown a special ejecting system could have been shown, preferably for the placement in the turnable middle part, consisting of three plates. Of these the two outermost can be movable in relation to the middle, whereby they can serve as a stripper plate and/or make space for an inlet system.

I claim:

1. A mold comprising:
   a first mold part;
   a second mold part; and
   a middle mold part;
   wherein at least one of the first mold part and the second mold part move relative to one another between an open position and a closed position;
   wherein the middle mold part is disposed between the first and second mold parts in the closed position;
   wherein at least one mold part is turnable about an axis which passes through each mold part in the closed position;
   wherein the first and second mold parts are turnable about said axis while the middle mold part remains rotationally stationary.

2. The mold according to claim 1 wherein said at least one mold part turnable about the axis rotates 180 degrees between molding cycles.

3. The mold according to claim 1 wherein said axis is parallel to the relative movement direction between the first and second mold parts.

4. The mold according to claim 1 further comprising a turnable axle which can engage and turn selected mold parts about said axis.

5. The mold according to claim 1 wherein in the closed position, at least two mold cavities are formed between the middle mold part and each of the first and second mold parts.

6. The mold according to claim 1 further comprising a frame to prevent the rotation of selected mold parts.

7. The mold according to claim 6 wherein the frame further comprises a knee hinge which allows transverse movement of said selected non-rotating mold parts.

8. The mold according to claim 1 wherein the mold parts are mounted on non-rotating mold plates, and the at least one turnable mold part is mounted on the mold plate by a rotating bearing.

9. The mold according to claim 8 wherein the at least one turnable mold part engages a turnable axle.

10. The mold according to claim 1 wherein said first and second mold parts have identical, but opposingly disposed inner faces.

11. The mold according to claim 1 wherein the middle mold part has identical, but opposingly disposed outer faces.

12. The mold according to claim 1 further comprising at least one rotatable bearing, wherein the at least one turnable mold part is affixed to an inner ring of the bearing, and any non-turnable mold parts are affixed to an outer ring of the bearing.

13. The mold according to claim 1 wherein the middle mold part is comprised of at least three plates.

* * * * *